US012649884B2

(12) United States Patent
Wang et al.

(10) Patent No.: US 12,649,884 B2
(45) Date of Patent: Jun. 9, 2026

(54) INTELLIGENCE SYSTEM AND PROCESS FOR MATERIAL BLENDING IN THE GASIFICATION

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Fangjie Wang, Beijing (CN); Shuqing Wang, Beijing (CN); Dachuan Wang, Beijing (CN); Guofu Xia, Beijing (CN); Longpeng Cui, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 1113 days.

(21) Appl. No.: 17/762,966

(22) PCT Filed: Sep. 24, 2020

(86) PCT No.: PCT/CN2020/117417
§ 371 (c)(1),
(2) Date: Mar. 23, 2022

(87) PCT Pub. No.: WO2021/057845
PCT Pub. Date: Apr. 1, 2021

(65) Prior Publication Data

US 2022/0340827 A1 Oct. 27, 2022

(30) Foreign Application Priority Data

Sep. 24, 2019 (CN) ........................ 201910906678.9

(51) Int. Cl.
*C10J 3/72* (2006.01)
*B01F 35/80* (2022.01)
*C10J 3/50* (2006.01)

(52) U.S. Cl.
CPC ............... *C10J 3/723* (2013.01); *B01F 35/80* (2022.01); *C10J 3/50* (2013.01); *C10J 2200/09* (2013.01);
(Continued)

(58) Field of Classification Search
CPC .... G05B 13/027; G05B 13/04; G05B 13/042; G06Q 10/063; G06Q 50/02; G06Q 50/04;
(Continued)

(56) References Cited

U.S. PATENT DOCUMENTS

| | | | |
|---|---|---|---|
| 5,695,532 | A | 12/1997 | Johnson et al. |
| 2009/0094141 | A1 | 4/2009 | Regnery et al. |

FOREIGN PATENT DOCUMENTS

| | | | |
|---|---|---|---|
| CN | 1831087 | A | 9/2006 |
| CN | 105080377 | A | 11/2015 |

(Continued)

OTHER PUBLICATIONS

Skvaril, Jan, Konstantinos G. Kyprianidis, and Erik Dahlquist. "Applications of near-infrared spectroscopy (NIRS) in biomass energy conversion processes: A review." Applied spectroscopy reviews 52.8 (2017): 675-728. (Year: 2017).*

(Continued)

*Primary Examiner* — Robert J Eom
(74) *Attorney, Agent, or Firm* — Panitch Schwarze Belisario & Nadel LLP

(57) ABSTRACT

Described are an intelligence system and process for material blending in the gasification. The system includes a subsystem for material blending in the gasification, wherein the subsystem for material blending in the gasification
(Continued)

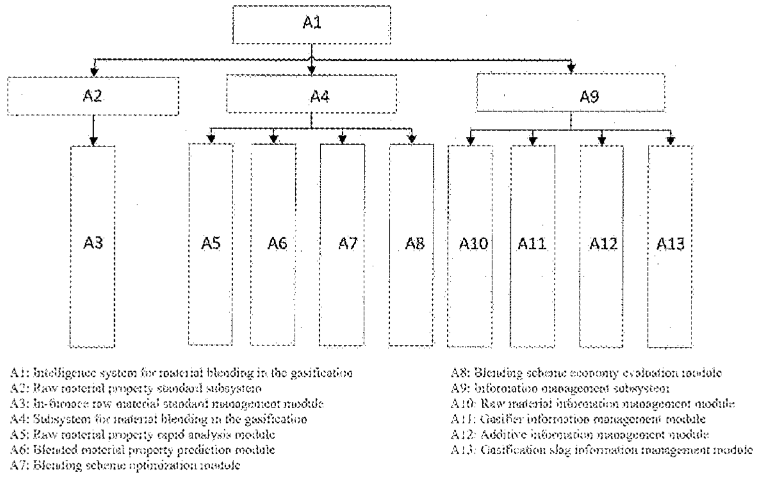

includes a raw material property rapid analysis module, for obtaining raw material property parameters of raw materials according to characteristic spectral line intensities of in-furnace raw materials; a blended material property prediction module, for establishing a prediction model, and predicting blended material property parameters by means of the prediction model according to raw material property parameters and raw material proportions; a blending scheme optimization module, for establishing an optimization model, and obtaining an optimized blending scheme by means of the optimization model according to blended material property parameters; a blending scheme economy evaluation module, for outputting a blending scheme with the optimum technical economy.

14 Claims, 3 Drawing Sheets

(52) U.S. Cl.
CPC ........ *C10J 2300/06* (2013.01); *C10J 2300/18* (2013.01)

(58) Field of Classification Search
CPC .. G06Q 50/06; B01F 35/80; C10J 3/30; C10J 3/50; C10J 3/72; C10J 3/723; C10J 2200/09; C10J 2300/06; C10J 2300/0903; C10J 2300/093; C10J 2300/18
See application file for complete search history.

(56) References Cited

FOREIGN PATENT DOCUMENTS

| | | | |
|---|---|---|---|
| CN | 106153657 | A | 11/2016 |
| CN | 107868678 | A | 4/2018 |
| CN | 109376945 | A | 2/2019 |
| CN | 110232497 | A | 9/2019 |
| RU | 2 134 713 | C1 | 8/1999 |

OTHER PUBLICATIONS

Alnouss, Ahmed, Gordon McKay, and Tareq Al-Ansari. "A techno-economic-environmental study evaluating the potential of oxygen-steam biomass gasification for the generation of value-added products." Energy Conversion and Management 196 (2019): 664-676. (Year: 2019).*

Zhu, Tong. Using LIBS and Advanced Data Processing to Analyze Biomass and Coal Feedstock for Utility Boiler Applications. Diss. Lehigh University, 2013. (Year: 2013).*

Esmaili, Ehsan, Ehsan Mostafavi, and Nader Mahinpey. "Economic assessment of integrated coal gasification combined cycle with sorbent CO2 capture." Applied Energy 169 (2016): 341-352. (Year: 2016).*

International Search Report (PCT/ISA/210) with and English translation, and Written Opinion (PCT/ISA/237) mailed on Dec. 15, 2020, by the China National Intellectual Property Administration as the International Searching Authority for International Application No. PCT/CN2020/117417. (8 pages).

Office Action issued on Apr. 28, 2023, by the Russian Patent Office in corresponding Russian Patent Application No. 2022110769, with English translation of the Office Action (15 pages).

* cited by examiner

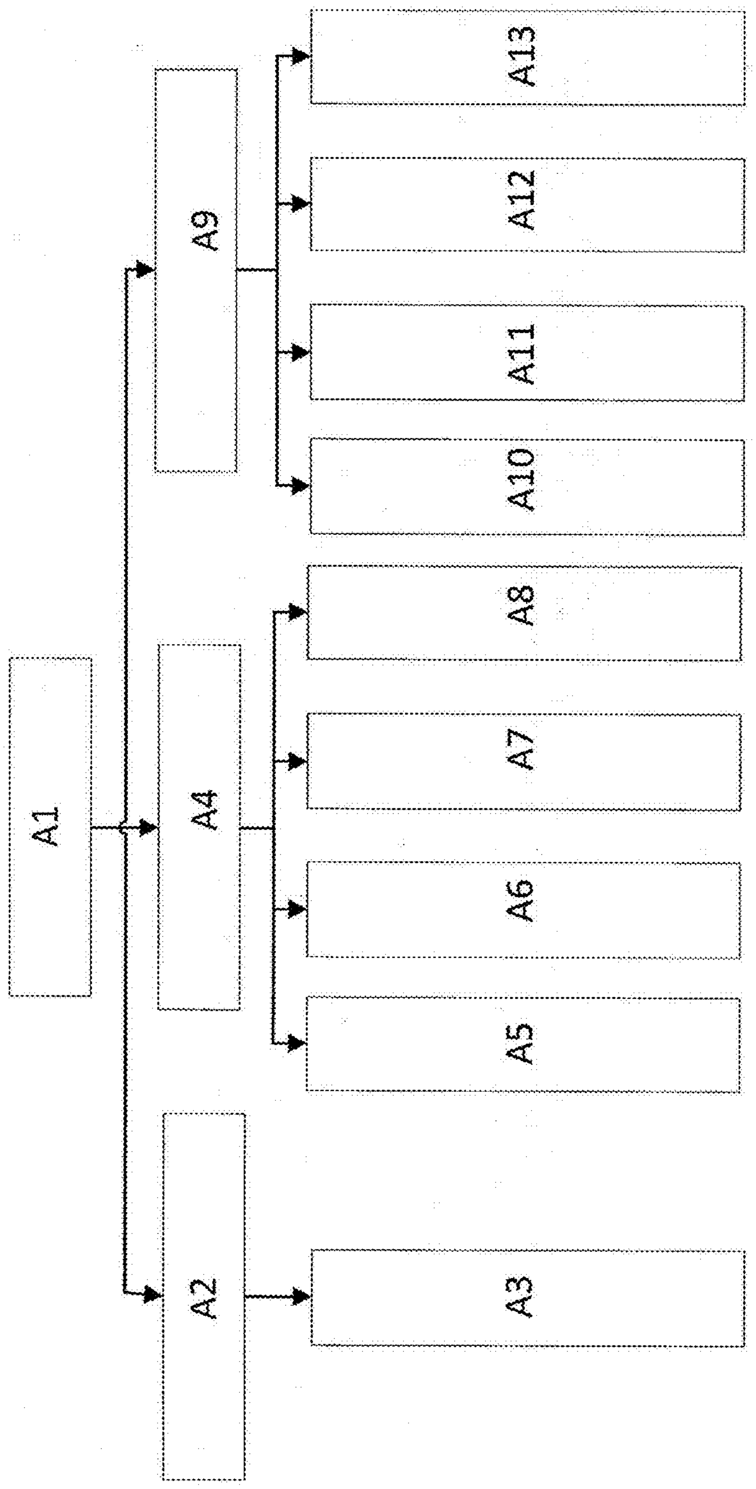

A1: Intelligence system for material blending in the gasification
A2: Raw material property standard subsystem
A3: In-furnace raw material standard management module
A4: Subsystem for material blending in the gasification
A5: Raw material property rapid analysis module
A6: Blended material property prediction module
A7: Blending scheme optimization module
A8: Blending scheme economy evaluation module
A9: Information management subsystem
A10: Raw material information management module
A11: Gasifier information management module
A12: Additive information management module
A13: Gasification slag information management module

Figure 1

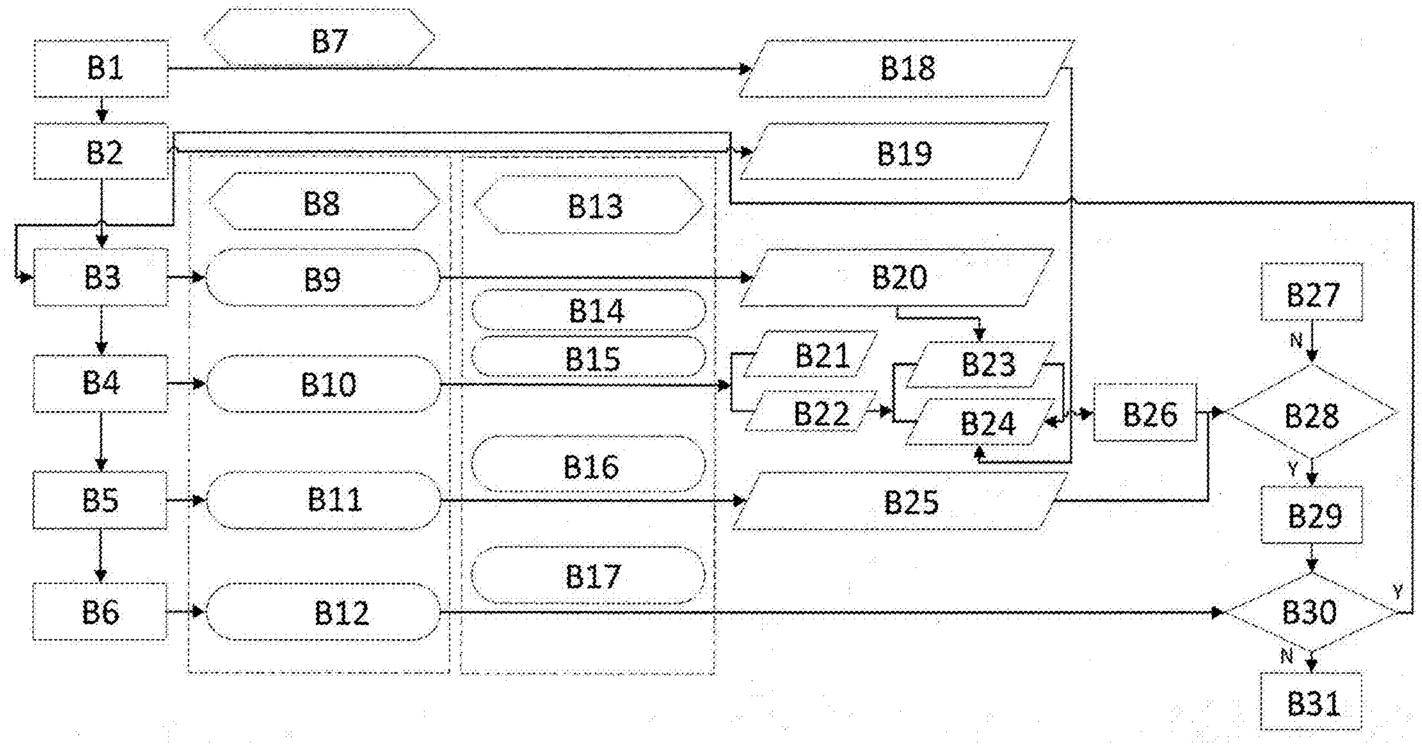

B1. Determining the gasifier type
B2. Selecting the blended raw materials
B3. Predicting the blended material properties
B4. Optimizing the blending scheme
B5. Blending scheme economy evaluation
B6. Early-warning and diagnosing the gasifier problem
B7. Raw material property standard subsystem
B8. Subsystem for material blending in the gasification
B9. Blended material property prediction module
B10. Blending scheme optimization module
B11. Blending scheme economy evaluation module
B12. Gasifier early-warning model
B13. Information management subsystem
B14. Raw material information management module
B15. Additive information management module
B16. Gasifier information management module
B17. Gasification slag information management module
B18. Requirement of the gasifier to raw materials
B19. Raw material property parameters
B20. Blended material property parameter
B21. Objective function
B22. Constraint condition
B23. Constraint function
B24. Constraint upper and lower limits
B25. Gasifier operation parameters
B26. Feasible blending scheme
B27. Alternative blending scheme
B28. Economy meeting the requirement?
B29. Optimum blending scheme
B30. Problem appearing in the prediction?
B31. Optimum blending scheme

Figure 2

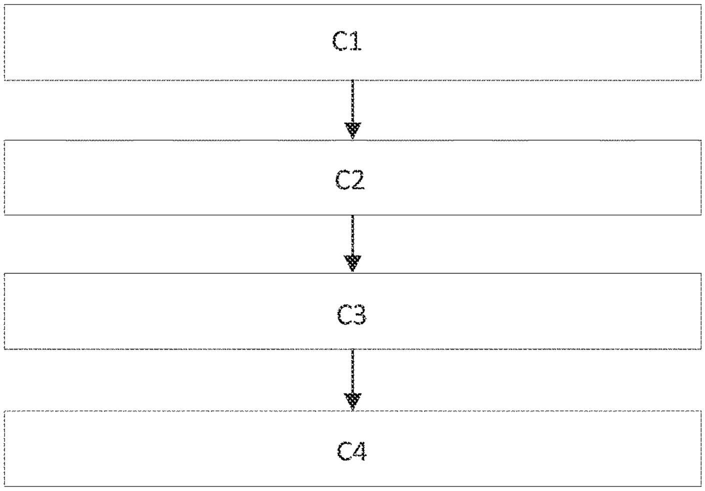

C1: Receiving characteristic spectral line intensities of in-furnace raw materials, and obtaining raw material property parameters of raw materials based on said characteristic spectral line intensities C2: Establishing a prediction model, predicting blended material property parameters with said prediction model based on raw material property parameters and raw material proportions C3: Establishing an optimization model, and obtaining an optimized blending scheme with said optimization model based on said blended material property parameters C4: Analyzing the technical economy of the optimized blending scheme and outputting a blending scheme with the optimum technical economy

Figure 3

INTELLIGENCE SYSTEM AND PROCESS FOR MATERIAL BLENDING IN THE GASIFICATION

TECHNICAL FIELD

The present invention relates to the technical field of the coal chemical industry, and specifically to an intelligence system for material blending in the gasification and an intelligence process for material blending in the gasification.

BACKGROUND TECHNOLOGY

The stable run of the gasifier (aka: gasification furnace) is one of the key economic goals pursued by coal chemical enterprises. The gasifier has certain operating conditions and stringent restrictions on the characteristics of the in-furnace raw materials (i.e., the raw materials fed into the furnace). In the actual production of coal chemical enterprises, there may be the following problems: first, the coal quality near the project is not suitable for gasifiers and cannot be applied locally; second, the coal quality fluctuates greatly, and the gasifier cannot run stably for a long period; third, problems in the coal supply or large price fluctuations, leading to unstable operation of the gasifier, and consequences such as corrosion, ash blocking, and even shutdown. Coal blending technology can effectively solve the above problems, realize the local application of coal near the project, thus reducing the costs; ensure the long-term stable operation of the gasifier, thus increasing the benefits; and improve the flexibility of the coal use in the project, thus reducing the risks. The traditional coal blending mainly depends on the experimental personnel of scientific research institutions to carry out a large number of cumbersome experiments to obtain the blending scheme, or on the long-term operation experiences accumulated by the relevant staff of the factory. There are problems of low efficiency and poor accuracy, so the best coal blending ratio for the gasifier cannot be effectively obtained. At the same time, gasification technology has been developed, promoted, and applied on a large scale in China. Coal is no longer the only raw material for gasification. The blending of various carbon-containing compounds as the gasification raw materials has become an important development trend in the coal gasification technology. Therefore, it is necessary to develop an intelligence system for material blending in the gasification that can construct the whole life cycle process of the blending scheme.

SUMMARY OF THE INVENTION

The purpose of the embodiments of the present invention is to provide an intelligence system and process for material blending in the gasification, to solve the problems of low efficiency and poor accuracy of the traditional coal blending technology and the inability to construct the whole life cycle process of the coal blending scheme.

To achieve the above purpose, in the first aspect of the present invention, an intelligence system for material blending in the gasification is provided, comprising:

A subsystem for material blending in the gasification, wherein said subsystem for material blending in the gasification includes a raw material property rapid analysis module, a blended material property prediction module, a blending scheme optimization module, and a blending scheme economy evaluation module;

Said raw material property rapid analysis module is for receiving characteristic spectral line intensities of in-furnace raw materials, and obtaining raw material property parameters of raw materials based on said characteristic spectral line intensities;

Said blended material property prediction module is for establishing a prediction model, which comprises predicting blended material property parameter(s) with said prediction model based on said raw material property parameter(s) and predetermined proportion(s);

Said blending scheme optimization module is for establishing an optimization model, and obtaining an optimized blending scheme with an objective function in said optimization model based on said blended material property parameter(s);

Said blending scheme economy evaluation module is for analyzing the technical economy of the optimized blending scheme and outputting a blending scheme with the optimum technical economy.

Alternatively, the system also includes a raw material property standard subsystem, wherein said raw material property standard subsystem includes an in-furnace raw material standard management module, said in-furnace raw material standard management module is for establishing and storing a mapping relationship between different types of gasifiers and their corresponding raw materials, to determine the in-furnace raw material after the gasifier type is determined.

Alternatively, said blended material property parameters include basic properties, ash fusion characteristics, slurry-forming characteristics, and gasification reactivity.

Alternatively, said basic properties include industrial analysis parameter, elemental analysis parameter, grindability parameter, and calorific value parameter.

Alternatively, said system further includes an information management subsystem, wherein said information management subsystem includes a raw material information management module, a gasifier information management module, an additive information management module, and a gasification slag information management module;

said raw material information management module is for storing raw material property parameters obtained from said raw material property rapid analysis module;

Said gasifier information management module is for establishing and storing a mapping relationship between different types of gasifiers and their corresponding operation parameters;

Said additive information management module is for establishing and storing a mapping relationship between the prediction for ash fusion characteristics and slurry-forming characteristics and its corresponding additives;

Said gasification slag information management module is for establishing and storing one-to-one mapping relationship among gasifier types, raw materials, gasifier operation parameters, and slag properties.

Alternatively, said subsystem for material blending in the gasification further comprises a gasifier early-warning module, said gasifier early-warning module is for establishing a functional relationship among blended materials, gasifier operation parameters, and slag properties, and predicting the corresponding slag properties according to blended materials of the obtained blending scheme with the optimum technical economy, and gasifier operation parameters, and judging whether or not the obtained slag properties are abnormal.

Alternatively, said gasifier early-warning module is still for comparing the obtained slag properties with the pre-stored slag properties in case of judging the obtained slag properties as abnormal, and obtaining the relevant parameter(s) leading to the abnormal slag properties according to a mapping relationship between the pre-stored slag properties and the types of gasifiers, raw materials, and gasifier operation parameters.

In the second aspect of the present invention, an intelligence process for material blending in the gasification is provided, comprising a substep of material blending in the gasification, wherein said substep of material blending in the gasification comprises:

Receiving characteristic spectral line intensities of in-furnace raw materials, and obtaining raw material property parameters of raw materials based on said characteristic spectral line intensities;

Establishing a prediction model, which comprises predicting blended material property parameters with said prediction model based on said raw material property parameters and raw material proportions;

Establishing an optimization model, and obtaining an optimized blending scheme with said optimization model based on said blended material property parameters;

Analyzing the technical economy of the optimized blending scheme, and outputting a blending scheme with the optimum technical economy.

Alternatively, the process further comprises a substep for raw material property standard, wherein the substep for raw material property standard comprises:

Establishing and storing a mapping relationship between different types of gasifiers and their corresponding raw materials, to determine the in-furnace raw material after the gasifier type is determined.

Alternatively, said blended material property parameters include basic properties, ash fusion characteristics, slurry-forming characteristics, and gasification reactivity.

Alternatively, said basic properties include industrial analysis parameter, elemental analysis parameter, grindability parameter, and calorific value parameter.

Alternatively, the process further comprises a substep of information management, wherein the substep of information management comprises:

Storing raw material property parameters obtained from said raw material property rapid analysis module;

Establishing and storing a mapping relationship between different types of gasifiers and their corresponding operation parameters;

Establishing and storing a mapping relationship between the prediction for ash fusion characteristics and slurry-forming characteristics and its corresponding additives;

Establishing and storing one-to-one mapping relationship among gasifier types, raw materials, gasifier operation parameters, and slag properties.

Alternatively, said substep of material blending in the gasification further comprises:

Establishing a functional relationship among blended materials, gasifier operation parameters, and slag properties, predicting the corresponding slag properties according to blended materials of the obtained blending scheme with the optimum technical economy, and gasifier operation parameters, and judging whether or not the obtained slag properties are abnormal.

Alternatively, said substep of material blending in the gasification further comprises: comparing the obtained slag properties with the pre-stored slag properties in case of judging the obtained slag properties as abnormal and obtaining the relevant parameter(s) leading to the abnormal slag properties according to a mapping relationship between the pre-stored slag properties and the types of gasifiers, raw materials and gasifier operation parameters.

The above technical solutions of the present invention construct an intelligence system for material blending in the gasification having a whole life cycle process by obtaining raw material property parameter(s) with raw material rapid analysis, predicting blended material property parameter(s) with an established prediction model based on the obtained raw material property parameter(s), and optimizing a blending scheme with an established objective function based on the obtained blended material property parameter(s), and analyzing the technical economy of the optimized blending scheme to obtain an optimum blending scheme; effectively improve the efficiency and accuracy of the coal blending; realize the intelligent and precise control of the material blending in the gasification; can effectively reduce the adverse effect of raw material property problems on the enterprise.

Specifically, the present invention also provides the undermentioned technical solutions:

Technical solution 1. A system for material blending in the gasification, which system is characterized by including:

a subsystem for material blending in the gasification, wherein said subsystem for material blending in the gasification includes a raw material property rapid analysis module, a blended material property prediction module, a blending scheme optimization module, and a blending scheme economy evaluation module;

said raw material property rapid analysis module is for receiving characteristic spectral line intensities of in-furnace raw materials, and obtaining raw material property parameters of raw materials based on said characteristic spectral line intensities;

said blended material property prediction module is for establishing a prediction model, which comprises predicting blended material property parameters with said prediction model based on said raw material property parameters and raw material proportions;

said blending scheme optimization module is for establishing an optimization model and obtaining an optimized blending scheme with said optimization model based on said blended material property parameters;

said blending scheme economy evaluation module is for analyzing the technical economy of the optimized blending scheme and outputting a blending scheme with the optimum technical economy.

Technical solution 2. The system for material blending in the gasification according to technical solution 1, wherein the system also includes a raw material property standard subsystem, wherein said raw material property standard subsystem includes an in-furnace raw material standard management module, said in-furnace raw material standard management module is used to establish and store a mapping relationship between different types of gasifiers and their corresponding raw materials, to determine the in-furnace raw material after the gasifier type is determined.

Technical solution 3. The system for material blending in the gasification according to any of technical solutions 1-2, which is characterized in that said blended material property parameters include basic properties, ash fusion characteristics, slurry-forming characteristics, and gasification reactivity, preferably, said basic properties include industrial analysis parameter, elemental analysis parameter, grindability parameter, and calorific value parameter;

more preferably, the blended material property parameters predicted by said prediction model are industrial analysis parameter, elemental analysis parameter, calorific value parameter, and optionally ash fusion characteristic parameter.

Technical solution 4. The system for material blending in the gasification according to any of technical solutions 1-3, which is characterized in that said system further includes an information management subsystem, wherein said information management subsystem includes a raw material information management module, a gasifier information management module, an additive information management module, and a gasification slag information management module;

said raw material information management module is for storing raw material property parameters obtained from said raw material property rapid analysis module;

said gasifier information management module is for establishing and storing a mapping relationship between different types of gasifiers and their corresponding operation parameters;

said additive information management module is for establishing and storing a mapping relationship between the prediction for ash fusion characteristics and slurry-forming characteristics and its corresponding additives;

said gasification slag information management module is for establishing and storing one-to-one mapping relationship among gasifier types, raw materials, gasifier operation parameters, and slag properties.

Technical solution 5. The system for material blending in the gasification according to any of technical solutions 1-4, which is characterized in that said subsystem for material blending in the gasification further comprises a gasifier early-warning module, said gasifier early-warning module is for establishing a functional relationship among blended materials, gasifier operation parameters, and slag properties, and predicting the corresponding slag properties according to blended materials of the obtained blending scheme with the optimum technical economy, and gasifier operation parameters, and judging whether or not the obtained slag properties are abnormal.

Technical solution 6. The system for material blending in the gasification according to any of technical solutions 1-5, which is characterized in that said gasifier early-warning module is still for comparing the obtained slag properties with the pre-stored slag properties in case of judging the obtained slag properties as abnormal, and obtaining the relevant parameter(s) leading to the abnormal slag properties according to a mapping relationship between the pre-stored slag properties and the types of gasifiers, raw materials, and gasifier operation parameters.

Technical solution 7. The system for material blending in the gasification according to any of technical solutions 1-6, which is characterized in that said blended material property prediction module is for establishing a prediction model, which further comprises: predicting blended material property parameter(s) with said prediction model based on said raw material property parameter(s), raw material proportion(s), inherent moisture $M_{ad}$, grindability index HGI, and specific surface area $S_{BET}$, and optionally additive information, and the blended material property parameter(s) to be predicted include the slurry-forming characteristic of the blended material and the gasification reactivity of the blended material, and optionally ash fusion characteristic.

Technical solution 8. A process for material blending in the gasification, which is characterized by including a substep of material blending in the gasification, said substep of material blending in the gasification includes:

receiving characteristic spectral line intensities of in-furnace raw materials, and obtaining raw material property parameters of raw materials based on said characteristic spectral line intensities;

establishing a prediction model, which comprises predicting blended material property parameters with said prediction model based on said raw material property parameters and raw material proportions;

establishing an optimization model, and obtaining an optimized blending scheme with said optimization model based on said blended material property parameters;

analyzing the technical economy of the optimized blending scheme, and outputting a blending scheme with the optimum technical economy.

Technical solution 9. the process for material blending in the gasification according to technical solution 8, which is characterized in that the process further comprises a substep for raw material property standard, wherein the substep for raw material property standard comprises:

Establishing and storing a mapping relationship between different types of gasifiers and their corresponding raw materials, to determine the in-furnace raw material after the gasifier type is determined.

Technical solution 10. The process for material blending in the gasification according to any of technical solutions 8-9, which is characterized in that said blended material property parameters include basic properties, ash fusion characteristics, slurry-forming characteristics, and gasification reactivity characteristics, preferably, said basic properties include industrial analysis parameter, elemental analysis parameter, grindability parameter, and calorific value parameter;

more preferably, the blended material property parameters predicted by said prediction model are industrial analysis parameter, elemental analysis parameter, calorific value parameter, and optionally ash fusion characteristic parameter.

Technical solution 11. the process for material blending in the gasification according to any of technical solutions 8-10, which is characterized in that the process further comprises a substep for information management, wherein the substep for information management comprises:

storing raw material property parameters obtained from said raw material property rapid analysis module;

establishing and storing a mapping relationship between different types of gasifiers and their corresponding operation parameters;

establishing and storing a mapping relationship between the prediction for ash fusion characteristics and slurry-forming characteristics and its corresponding additives;

establishing and storing one-to-one mapping relationship among gasifier types, raw materials, gasifier operation parameters, and slag properties.

Technical solution 12. The process for material blending in the gasification according to any of technical solutions 8-11, which is characterized in that said substep of material blending in the gasification further comprises:

establishing a functional relationship among blended materials, gasifier operation parameters, and slag properties, predicting the corresponding slag properties according to blended materials of the obtained blending scheme with the optimum technical economy, and gasifier operation parameters, and judging whether or not the obtained slag properties are abnormal.

Technical solution 13. The process for material blending in the gasification according to any of technical solutions 8-12, which is characterized in that said substep of material blending in the gasification further comprises:

comparing the obtained slag properties with the pre-stored slag properties in case of judging the obtained slag properties as abnormal, and obtaining the relevant parameter(s) leading to the abnormal slag properties according to a mapping relationship between the pre-stored slag properties and the types of gasifiers, raw materials, and gasifier operation parameters.

Technical solution 14. The process for material blending in the gasification according to any of technical solutions 8-13, which is characterized by that Establishing a prediction model, which further comprises: predicting blended material property parameter(s) with said prediction model based on said raw material property parameter(s), raw material proportion(s), inherent moisture $M_{ad}$, grindability index HGI, and specific surface area $S_{BET}$, and optionally additive information, and the blended material property parameter(s) to be predicted include the slurry-forming characteristic of the blended material and the gasification reactivity of the blended material, and optionally ash fusion characteristic.

Additional features and advantages of embodiments of the present invention are described in detail in the following section of Detailed Description.

BRIEF DESCRIPTION OF THE DRAWINGS

The accompanying drawings are used to provide a further understanding of the embodiments of the present invention and constitute a part of the specification, and together with the following Detailed Description, are used to explain the embodiments of the present invention, but do not limit the embodiments of the present invention. In the accompanying drawings:

FIG. 1 is a system structure schematic diagram of an intelligence system for material blending in the gasification provided by an embodiment of the present invention;

FIG. 2 is a system operation flow diagram of an intelligence system for material blending in the gasification provided by an embodiment of the present invention; and FIG. 3 is a process flow diagram of an intelligence process for material blending in the gasification provided by an embodiment of the present invention.

DETAILED DESCRIPTION OF THE INVENTION

The specific embodiments of the present invention will be described in detail below with reference to the accompanying drawings. It should be understood that the specific embodiments described herein are only used to illustrate and explain the present invention and are not intended to limit the present invention.

In embodiments of the present invention, the terms "comprise", "contain", and any other variation thereof are intended to cover non-exclusive inclusion, so that a process, a method, a product, or a device including a series of elements includes not only those elements, but also other elements not explicitly listed, or elements inherent to such process, method, product or device. Without further restrictions, an element defined by the statement "comprise a/an . . . " does not exclude the presence of another identical element in the process, method, product, or device including said element.

As shown in FIG. 1 and FIG. 2, in the first aspect of the present invention, an intelligence system for material blending in the gasification is provided, comprising:

A subsystem for material blending in the gasification, wherein said subsystem for material blending in the gasification includes a raw material property rapid analysis module, a blended material property prediction module, a blending scheme optimization module, and a blending scheme economy evaluation module;

Said raw material property rapid analysis module is for receiving characteristic spectral line intensities of in-furnace raw materials, and obtaining raw material property parameters of raw materials according to said characteristic spectral line intensities;

Said blended material property prediction module is for establishing a prediction model, which comprises predicting blended material property parameters with the prediction model according to raw material property parameters and raw material proportions;

Said blending scheme optimization module is for establishing an optimization model, and obtaining an optimized blending scheme with the optimization model according to blended material property parameters;

Said blending scheme economy evaluation module is for analyzing the technical economy of the optimized blending scheme and outputting a blending scheme with the optimum technical economy.

In this way, the above technical solution of the present embodiment constructs an intelligence system for material blending in the gasification having a whole life cycle process by obtaining raw material property parameter(s) with raw material rapid analysis, predicting blended material property parameter(s) with an established prediction model based on the obtained raw material property parameter(s) and predetermined raw material proportion(s), and optimizing a blending scheme with an established optimization model based on the obtained blended material property parameter(s), and analyzing the technical economy of the optimized blending scheme so as to obtain an optimum blending scheme; effectively improves the efficiency and accuracy of the coal blending; realizes the intelligent and precise control of the coal blending in the gasification by establishing a coal quality prediction model for the coal blending with the computer technology; can effectively reduce the adverse effect of raw material property problems on the enterprise.

Specifically, the stable run of the gasifier is closely related to the properties of the in-furnace raw materials. To maintain the stable operation of the gasifier, it is necessary to strictly limit the in-furnace raw materials. Different individual raw materials have different characteristics. To meet the gasification requirement, the in-furnace raw materials are usually formed by mixing multiple individual raw materials, and therefore the blending scheme of the in-furnace raw materials is particularly important. In the present embodiment, the individual raw material may be carbonaceous materials such as coal, semi-coke, petroleum coke, biomass, sludge, oil sludge, and waste carbon. Due to the disadvantages of slow analysis speed and cumbersome procedures, the offline analysis commonly used for coal composition analysis at present, cannot provide real-time online reference data for operators, and it is difficult for the offline analysis to meet the needs of industrial production. This embodiment adopts laser-induced breakdown spectroscopy technology (LIES) to obtain the characteristic spectral line intensity of the sample to be tested. The laser-induced breakdown spectroscopy technology refers to that when an intense pulsed laser is focused and irradiated on the sample, the sample will be instantly vaporized into a high-temperature, high-density plasma, and the plasma in an excited state will emit different rays to the outside. The wavelength and intensity corresponding to the spectral line of the plasma emission reflect the constituent elements and their concentrations in the measured object respectively. LIES has the advantages of fast detection, high sensitivity, low cost, and the ability to analyze multiple elements at the same time. The raw material property rapid analysis module receives the characteristic spectral line intensity of the raw material to be tested obtained by the LIES detector, and the existing special algorithms such as spectral normalization algorithm and self-absorption correction algorithm are used to calculate and analyze the characteristic spectral line intensity to obtain the raw material property parameters of raw materials to be tested, and the individual raw materials are detected respectively to obtain the property parameters of each individual raw material. Among them, the raw material property parameters include carbon, hydrogen, sulfur, and ash-forming element contents, ash, volatile matter, and calorific value.

The blended material property prediction module establishes a prediction model, in which the property parameters and proportions of individual raw materials are used as the input and the blended material property parameter is used as the output. Among them, the blended material property parameter includes basic properties, ash fusion characteristics, slurry-forming characteristics, and gasification reactivity characteristics; the basic properties include industrial analysis parameter, elemental analysis parameter, grindability parameter, and calorific value parameter. In this embodiment, the blended material property prediction module predicts basic properties, ash fusion characteristics, slurry-forming characteristics, and gasification reactivity characteristics of the blended material by establishing a basic properties prediction model, an ash fusion characteristics prediction model, a slurry-forming characteristics prediction model, and a gasification reactivity characteristics prediction model respectively, wherein the basic property prediction model is established based on the linear weighted sum algorithm; the ash fusion characteristics prediction model, the slurry-forming characteristics prediction model, and the gasification reactivity characteristics prediction model are established based on BP neural network; the prediction models are not limited to the above algorithms, and can also be established based on other algorithms, such as convolutional neural networks.

The blending scheme optimization module establishes an objective function according to the demand for the blending scheme; the number of the objective function(s) can be one or more, and the number of the obtained feasible blending scheme(s) can be more than one. For example, the objective function can be established based on requirements such as the lowest price of the blended material, the highest calorific value, the best environmental protection, or the like. The constraint conditions that the blended material for the gasification needs to meet are determined. The constraint condition refers to a limitation condition when finding the extreme value of the objective function. The constraint condition in this embodiment is the requirement of the gasifier for the blended material fed into the furnace, that is, the requirements of the gasifier for the blended material property parameters and the variation ranges of related property parameters. The functional relationship between the property parameters of an individual raw material and the proportion of the raw material is obtained through the blended material property prediction module, and the upper and lower limits of the variation range of the raw material property parameters for the gasifier are acquired to obtain the constraint conditions of the objective function. Based on the established objective function and considering the constraint conditions, an optimization model is established.

On the one hand, the blending scheme economy evaluation module can perform technical and economic analysis on all feasible blending schemes that are obtained by optimization by calling the process simulation software, and select a scheme for which the product structure is suitable and the economy is good as the optimum blending scheme according to the predetermined target, to realize the real-time on-line regulation of the blending proportion. On the other hand, by adjusting the gasifier operation parameters, the optimum effect on the product structure and the economy can be achieved, and meanwhile, the operation stability can be guaranteed. Among them, the technical and economic analysis of the feasible batching scheme can be analyzed based on the actual demand based on the gasification technological conditions, including the feed rate, the oxygen flow rate, the additive amount, the gasification temperature, the gasification pressure, and the carbon conversion rate, and the composition of the syngas and the cost of raw materials are used as the judging criteria.

In this embodiment, the system also includes a raw material property standard subsystem, wherein said raw material property standard subsystem includes an in-furnace raw material standard management module, said in-furnace raw material standard management module is used to establish and store a mapping relationship between different types of gasifiers and their corresponding raw materials, to determine the in-furnace raw material after the gasifier type is determined. Different types of gasifiers have different requirements for their in-furnace raw materials, for example, the gasifier has different requirements for the composition, the proportion, and the calorific value of the in-furnace raw materials. To make the gasifier operate stably, the in-furnace raw materials must meet the requirements of the gasifier for raw materials. The mapping relationship between different types of gasifiers and their corresponding requirements for in-furnace raw materials is established and stored in advance through the in-furnace raw material standard management module. It is conducive to quickly calling the corresponding raw material requirements of the selected gasifier for the subsequent steps when predicting the blending scheme of in-furnace raw materials. Meanwhile, the switch between different gasifiers can be easily performed, and the work efficiency is effectively improved.

The system of this embodiment further includes an information management subsystem, wherein said information management subsystem includes a raw material information management module, a gasifier information management module, an additive information management module, and a gasification slag information management module;

said raw material information management module is for storing raw material property parameters obtained from said raw material property rapid analysis module;

said gasifier information management module is for establishing and storing a mapping relationship between different types of gasifiers and their corresponding operation parameters; said additive information management module is for establishing and storing a mapping relationship between the prediction for ash fusion characteristics and slurry-forming characteristics and its corresponding additives;

said gasification slag information management module is for establishing and storing one-to-one mapping relationship among gasifier types, raw materials, gasifier operation parameters, and slag properties.

Specifically, after each time the raw material property rapid analysis module predicts and produces the raw material property parameters, the obtained raw material property parameters are stored in the raw material information management module for easy query and use. Since different types of gasifiers have different operation parameters, to keep the gasifiers running stably, it is necessary to adjust the gasifiers strictly according to the operation parameters of different types of gasifiers. The mapping relationship between various types of gasifiers and their corresponding operation parameters is pre-established and stored in the gasifier information management module so that the corresponding gasifier operation parameters can be used after the blending scheme economy evaluation module produces the optimum blending scheme. Thereby the gasifier operation parameters are adjusted to ensure the stable run of the gasifier.

Since it is necessary to add an appropriate additive to the fed raw material in the processes of predicting the ash fusion characteristics through the ash fusion characteristics prediction model and predicting the slurry-forming characteristics through the slurry-forming characteristics prediction model, thereby a mapping relationship between the prediction for ash fusion characteristics and slurry-forming characteristics and its corresponding additives is pre-established and stored in the additive information management module, so that the additives can be accurately and quickly added during the prediction of the ash fusion and the prediction of the slurry-forming characteristic.

In coal gasification projects, the coal gasification slag accounts for an important proportion of solid waste. The coal gasification slag includes two parts: coarse slag and fine slag. The ash composition is related to the content and composition of the coal ash in the gasification raw material, the gasification process, and the like, and mainly includes $SiO_2$, $Al_2O_3$, CaO, residual carbon, and the like. With the composition of the gasification ash, it is possible to determine whether or not the in-furnace raw materials, the operation parameters, or the like of the gasifier meet the requirements. By establishing and storing the slag properties obtained from different raw materials under different gasifier operation parameters in the gasification slag information management module in advance, a one-to-one mapping relationship among gasifier types, raw materials, gasifier operation parameters, and slag properties can be obtained. Thereby it is possible to judge whether the obtained gasification slag is abnormal by using the pre-stored slag properties and to diagnose the abnormal cause according to the mapping relationship.

To guarantee the steady run of the gasifier, the subsystem for material blending in the gasification of this embodiment further comprises a gasifier early-warning module, said gasifier early-warning module is for establishing a functional relationship among blended materials, gasifier operation parameters, and slag properties, and predicting the corresponding slag properties according to blended materials of the obtained blending scheme with the optimum technical economy, and gasifier operation parameters, and judging whether or not the obtained slag properties are abnormal. The gasifier early-warning module establishes a slag property prediction model based on the BP neural network (but not limited to the BP neural network). A blending scheme obtained from the blending scheme optimization module is received.

According to the blended materials of the blending scheme and the corresponding gasifier operation parameters, the corresponding slag properties are obtained by predicting with the slag property prediction model. By using the mapping relationship in the gasification slag information management module, the slag properties are matched and compared and based on the comparison result, whether or not the slag properties are abnormal is judged. When the obtained slag properties are judged as abnormal, an alarm will be issued. The gasifier early-warning module will compare the obtained slag properties with the pre-stored slag properties that are obtained by matching, and according to the mapping relationship between the pre-stored slag properties and the types of gasifiers, the raw materials, and the gasifier operation parameters, the relevant parameters that cause the slag properties to be abnormal are obtained, thereby the gasification process is diagnosed and the problem source is found out. If the obtained slag properties are abnormal, the proportions of individual raw materials are adjusted according to the sub-optimum solution obtained from the blending scheme optimization module, and the proportions are updated in the blended material property prediction module, the processes of predicting the blended material property parameters, obtaining an optimized blending scheme, performing the technical and economic evaluation, outputting the optimum blending scheme, and predicting and diagnosing the slag properties are repeated until a blending scheme with optimum slag properties is obtained.

The present embodiment is illustrated below by using specific data as an example:

Preparation of Samples

A coal sample with a particle size of less than 0.2 mm was prepared according to GB-T 474-2008 “Method for preparation of coal sample”, and an ash sample was prepared according to GB-T 1574-2007 “Analysis method of ash composition”.

Basic Properties

In the present invention, TGA701 industrial analyzer could be used for the industrial analysis of the sample, VARIO Macro elemental analyzer could be used for the elemental analysis of the sample, IKA C6000 oxygen bomb calorimeter could be used to measure the calorific value, and X-ray fluorescence spectrometer could be used to measure the chemical composition of the sample ash. Industrial analysis of coal was also called technical analysis or practical analysis, including the determination of moisture, ash, and volatile matter in coal and the calculation of fixed carbon. Elemental analysis of coal was to determine the contents of five elements of carbon, hydrogen, oxygen, nitrogen, and sulfur in the coal. In the present invention, laser-induced breakdown spectroscopy could also be used to determine raw material property parameters, including carbon, hydrogen, sulfur, and ash-forming element contents, ash, volatile matter, and calorific value.

Ash Fusion Characteristics

According to GB/T 219-2008 “Determination of Fusibility of Coal Ash”, the ash fusion characteristic temperatures (deformation temperature DT, softening temperature ST, hemispherical temperature HT, flow temperature FT) were determined with the CAF-5 type-ash fusion point tester from Carbolite Company, UK. First, the ash sample was made into a triangular cone in a certain shape and size, placed in a high-temperature furnace with a weak reducing atmosphere, and heated at a certain heating rate. The change behavior of the ash cone was recorded with a camera during the heating process, and analyzed by software or observed with the naked eye to obtain the ash fusion characteristic temperatures.

The measurement process of the ash viscosity-temperature characteristic was referred to in the power industry standard DL/T 660-2007 "Test procedure for the viscosity of coal ash in high-temperature". The ash viscosity-temperature characteristics of the samples were measured using the RV DV-III high-temperature rotational viscometer from Theta Company, United States. The test procedure was as follows: (1) the coal ash was prepared; (2) the test temperature was determined according to the coal-ash flow temperature or the complete liquid phase temperature; (3) the coal ash was premelted in a high-temperature furnace, and cooled to form slag blocks for the test; (4) the slag blocks were placed in the testing crucible, evacuated in a vacuum protection tube, and the specified gas was introduced; (5) the temperature was raised to the measurement temperature, and the test was started after the temperature was constant, and the cooling rate was 1° C./min; (6) when the viscosity value exceeded 300 Pa·s or higher, the test was stopped to obtain the relationship between the sample ash viscosity and the temperature.

Slurry-Forming Characteristics

The apparent viscosity of coal-water slurry was measured using the NXS-4C coal-water slurry viscometer jointly developed by the National Coal-water Slurry Engineering Technology Research Center and Chengdu Instrument Factory. The measured concentration of the coal water slurry was measured according to GB/T 18856.2-2008 "Test methods for coal water mixture-Part 2: Determination of mass percentage of solid". The fluidity of the coal water slurry measured by visual inspection was divided into four grades: A for continuous flow, B for semi-continuous flow, C for intermittent flow, and D for no flow. The stability of the coal water slurry was measured according to GB/T 18856.5-2008 "Test methods for coal water mixture-Part 5: Determination of the stability".

Gasification Reactivity Characteristics

The gasification reactivity characteristics of the samples were measured by using an STA 449 F5 type thermal analyzer available from NETZSCH company, Germany. The test conditions: the heating rate was 15° C./min, the heating interval was 25-1400° C., the high-purity $N_2$ (99.999%) was used as protective gas, the flow rate was 20 mL/min, the furnace atmosphere was a mixed gas of $CO_2$ (99.999%) and $N_2$ (99.999%), and the flow rate was 50 mL/min. The gasification reactivity characteristics curve was obtained through the test, thereby obtaining the reactivity index.

It was determined that the gasifier was a GE coal-water slurry gasifier, and the requirement of the GE coal-water slurry gasifier to the in-furnace raw materials used by the in-furnace raw material standard management module was as follows: the calorific value ≥25.12 MJ/kg, the inherent moisture ≥8%, the coal slurry concentration ≥60%, the apparent viscosity ≥1500 MPa·s, the ash content ≥13%, and the ash fusion point ≥1300° C. According to the requirements of the GE coal-water slurry gasifier to the in-furnace raw materials as well as the on-site conditions, it was determined that the in-furnace raw materials were obtained by blending coal with semi-coke. Two individual raw materials were subjected to the raw material property analyses by the raw material property rapid analysis module to obtain the property parameters of each raw material, wherein the property parameters of the raw materials included carbon, hydrogen, sulfur, and ash-forming element contents, ash, volatile matter, and calorific value. The ash fusion characteristics, the slurry-forming characteristics, and the gasification reactivity characteristics of raw materials were obtained through field experiments. The basic properties and the ash fusion characteristics of the coal and the semi-coke were shown in Table 1; the slurry-forming characteristics of the coal and the semi-coke powder were shown in Table 2; the gasification reactivity characteristics of the coal and the semi-coke powder were shown in Table 3.

TABLE 1

Basic properties and the ash fusion characteristics of the coal and the semi-coke powder

| Sample | Item | | | |
|---|---|---|---|---|
| | $Q_{ad,net}$/MJ · kg$^{-1}$ | $M_{ad}$/% | $A_{ad}$/% | FT/° C. |
| Coal | 26.51 | 6.16 | 11.68 | 1107 |
| Semi-coke Powder | 27.27 | 8.05 | 6.65 | 1165 |

TABLE 2

Slurry-forming characteristics of the coal and the semi-coke powder

| Sample | Item | |
|---|---|---|
| | Max. slurry-forming concentration/% | Viscosity/ mPa · s |
| Coal | 60 | 906.5 |
| Semi-coke Powder | 62 | 559.0 |

TABLE 3

Gasification reactivity characteristics of the coal and the semi-coke powder

| Sample | Item<br>Reactivity index $R_{0.5}$ (×10$^{-3}$) |
|---|---|
| Coal | 6.99 |
| Semi-coke Powder | 7.28 |

The blended material property prediction module established the basic property prediction model based on the linear weighted sum algorithm and established the ash fusion characteristics prediction model, the slurry-forming characteristics prediction model, and the gasification reactivity characteristics prediction model, based on the BP neural network. By using the raw material property parameters stored in the raw material information management module, the data sets were generated to train the BP neural network.

Taking the establishment of the ash fusion characteristics prediction model based on the BP neural network as an example, the establishment of the prediction model was illustrated: 80 samples of the raw material were collected (see Table A), the basic properties and the ash fusion characteristics of coal samples were measured, and the obtained experimental data were used to establish the prediction model, wherein 40 data were used to establish the model, and 40 data were used to verify the prediction effect of the model. The BP neural network had a three-layer network structure. The input layer involved the individual raw material property parameters and proportions, and the output layer involved the blended material property parameters. The error back propagation algorithm was used to optimize the weights and the thresholds of the BP neural network. Neurons in the hidden layer mostly adopted sigmoid transfer functions (such as "tansig" in Matlab), and neurons in the output layer mostly adopted linear transfer functions (such as "purelin" in Matlab). The results showed that the predicted values of the model were in good agreement with the measured values.

TABLE A

| Coal Samples | $SiO_2$ | $Al_2O_3$ | CaO | $Fe_2O_3$ | $K_2O$ | $Na_2O$ | MgO | $SO_3$ | FT |
|---|---|---|---|---|---|---|---|---|---|
| 1 | 41.76 | 21.69 | 10.07 | 8.34 | 2.30 | 2.16 | 3.63 | 7.98 | 1350 |
| 2 | 32.70 | 17.41 | 19.52 | 10.77 | 0.81 | 1.29 | 0.85 | 14.19 | 1171 |
| 3 | 33.20 | 18.01 | 15.69 | 16.60 | 0.65 | 0.85 | 1.19 | 11.97 | 1198 |
| 4 | 50.43 | 28.08 | 5.23 | 6.16 | 2.81 | 0.83 | 1.60 | 2.64 | 1417 |
| 5 | 22.54 | 14.79 | 32.49 | 7.89 | 0.18 | 1.14 | 0.59 | 19.01 | 1386 |
| 6 | 41.87 | 18.72 | 12.38 | 8.33 | 2.50 | 1.14 | 1.09 | 10.27 | 1306 |
| 7 | 25.97 | 12.48 | 32.26 | 10.04 | 0.47 | 0.85 | 1.43 | 14.00 | 1207 |
| 8 | 18.47 | 17.35 | 32.66 | 7.02 | 0.09 | 4.39 | 3.92 | 4.85 | 1346 |
| 9 | 37.00 | 22.80 | 12.50 | 6.13 | 1.55 | 4.34 | 2.46 | 9.50 | 1351 |
| 10 | 53.00 | 26.40 | 3.51 | 6.18 | 3.08 | 2.02 | 1.85 | 2.15 | 1386 |
| 11 | 25.50 | 18.60 | 18.00 | 8.66 | 0.31 | 7.23 | 3.26 | 11.90 | 1153 |
| 12 | 28.10 | 18.50 | 17.00 | 8.88 | 0.42 | 6.90 | 2.96 | 10.80 | 1156 |
| 13 | 28.90 | 18.90 | 17.00 | 9.28 | 0.60 | 6.36 | 2.92 | 10.30 | 1145 |
| 14 | 28.40 | 18.60 | 17.70 | 9.99 | 0.56 | 6.21 | 2.85 | 9.62 | 1153 |
| 15 | 24.60 | 16.60 | 21.60 | 10.70 | 0.47 | 6.20 | 2.90 | 10.60 | 1162 |
| 16 | 34.50 | 20.10 | 16.00 | 9.34 | 1.18 | 4.57 | 2.61 | 6.98 | 1204 |
| 17 | 21.50 | 14.20 | 27.50 | 14.40 | 0.35 | 4.61 | 3.14 | 9.58 | 1210 |
| 18 | 25.80 | 16.30 | 22.00 | 11.70 | 0.53 | 5.48 | 2.86 | 10.20 | 1170 |
| 19 | 28.20 | 17.30 | 21.30 | 9.69 | 0.62 | 5.44 | 2.94 | 9.58 | 1162 |
| 20 | 40.00 | 22.00 | 11.90 | 8.86 | 1.89 | 3.21 | 3.12 | 5.48 | 1314 |
| 21 | 27.20 | 16.90 | 23.20 | 10.90 | 0.96 | 4.53 | 2.64 | 8.61 | 1166 |
| 22 | 19.80 | 13.30 | 26.70 | 13.10 | 0.22 | 6.62 | 3.46 | 10.30 | 1233 |
| 23 | 20.60 | 13.60 | 28.60 | 11.00 | 0.34 | 6.19 | 3.45 | 10.80 | 1256 |
| 24 | 25.10 | 16.20 | 21.20 | 11.60 | 0.44 | 6.29 | 3.03 | 10.40 | 1164 |
| 25 | 17.80 | 11.80 | 34.80 | 13.90 | 0.35 | 4.67 | 3.02 | 8.71 | 1321 |
| 26 | 16.60 | 12.20 | 30.90 | 15.50 | 0.20 | 4.89 | 3.45 | 11.10 | 1307 |
| 27 | 20.40 | 13.40 | 31.10 | 13.20 | 0.48 | 4.82 | 3.15 | 8.70 | 1261 |
| 28 | 25.00 | 15.40 | 24.00 | 12.50 | 0.68 | 4.63 | 2.91 | 9.58 | 1157 |
| 29 | 28.80 | 17.90 | 18.70 | 10.30 | 0.88 | 5.76 | 2.94 | 9.06 | 1168 |
| 30 | 20.9 | 14.00 | 21.70 | 11.90 | 0.24 | 5.40 | 3.26 | 16.80 | 1205 |
| 31 | 48.50 | 25.40 | 6.02 | 7.75 | 2.67 | 1.97 | 1.42 | 3.74 | 1302 |
| 32 | 45.50 | 20.80 | 13.80 | 7.59 | 2.63 | 1.49 | 1.60 | 2.89 | 1200 |
| 33 | 39.64 | 20.31 | 12.00 | 8.66 | 1.43 | 3.02 | 4.35 | 7.56 | 1169 |
| 34 | 38.76 | 18.23 | 13.28 | 9.78 | 0.59 | 3.12 | 3.29 | 7.48 | 1281 |
| 35 | 37.48 | 18.96 | 14.14 | 8.58 | 0.00 | 3.74 | 3.47 | 7.20 | 1147 |
| 36 | 34.81 | 16.40 | 17.78 | 9.91 | 0.14 | 3.29 | 3.10 | 7.76 | 1146 |
| 37 | 35.48 | 18.74 | 14.44 | 8.64 | 0.00 | 4.30 | 3.76 | 7.61 | 1175 |
| 38 | 25.61 | 13.15 | 25.63 | 13.26 | 0.00 | 3.12 | 4.05 | 8.80 | 1136 |
| 39 | 38.82 | 16.95 | 17.68 | 10.48 | 0.63 | 1.47 | 0.50 | 12.38 | 1155 |
| 40 | 41.36 | 21.78 | 10.94 | 9.05 | 1.59 | 2.49 | 5.56 | 6.17 | 1221 |
| 41 | 39.07 | 18.46 | 15.92 | 9.12 | 0.06 | 3.93 | 3.01 | 5.89 | 1123 |
| 42 | 32.01 | 15.97 | 17.41 | 10.89 | 0.00 | 4.76 | 3.54 | 13.05 | 1198 |
| 43 | 44.84 | 21.26 | 9.97 | 8.44 | 1.31 | 3.11 | 2.20 | 5.38 | 1159 |
| 44 | 46.02 | 22.23 | 9.55 | 8.17 | 1.51 | 2.80 | 1.94 | 4.75 | 1178 |
| 45 | 47.01 | 23.85 | 7.93 | 7.69 | 1.82 | 2.79 | 1.95 | 4.39 | 1206 |
| 46 | 46.90 | 23.77 | 8.52 | 6.96 | 1.63 | 2.69 | 1.86 | 5.06 | 1205 |
| 47 | 48.07 | 23.11 | 8.08 | 8.25 | 1.68 | 2.38 | 1.83 | 4.29 | 1205 |
| 48 | 48.49 | 23.82 | 7.73 | 7.72 | 1.93 | 2.42 | 1.84 | 3.64 | 1218 |
| 49 | 46.53 | 24.31 | 7.70 | 8.02 | 1.87 | 2.27 | 2.09 | 4.37 | 1254 |
| 50 | 42.45 | 21.27 | 10.89 | 9.73 | 1.34 | 2.43 | 2.63 | 6.16 | 1178 |
| 51 | 35.30 | 22.60 | 13.80 | 8.77 | 1.26 | 1.41 | 1.03 | 11.80 | 1186 |
| 52 | 37.60 | 20.30 | 20.00 | 5.01 | 0.35 | 1.37 | 0.60 | 4.36 | 1183 |
| 53 | 40.20 | 23.70 | 15.10 | 5.79 | 0.63 | 1.36 | 1.18 | 6.42 | 1158 |
| 54 | 49.70 | 20.90 | 8.92 | 7.14 | 2.14 | 1.06 | 2.24 | 4.36 | 1228 |
| 55 | 43.30 | 32.70 | 6.91 | 4.80 | 1.17 | 0.77 | 1.00 | 5.23 | 1336 |
| 56 | 42.40 | 31.10 | 5.22 | 10.10 | 0.790 | 0.80 | 0.57 | 4.41 | 1329 |
| 57 | 39.60 | 25.50 | 8.92 | 11.40 | 0.62 | 1.13 | 0.58 | 8.59 | 1260 |
| 58 | 37.80 | 24.20 | 14.90 | 6.41 | 0.53 | 1.79 | 1.42 | 8.09 | 1325 |
| 59 | 42.40 | 30.90 | 5.45 | 9.27 | 0.76 | 0.90 | 0.54 | 5.03 | 1357 |
| 60 | 23.50 | 12.70 | 25.60 | 11.60 | 0.28 | 0.83 | 1.14 | 18.80 | 1244 |
| 61 | 35.50 | 17.80 | 15.20 | 7.59 | 1.70 | 1.02 | 1.15 | 12.60 | 1144 |
| 62 | 23.00 | 13.10 | 24.20 | 13.20 | 0.37 | 1.15 | 1.39 | 19.50 | 1271 |
| 63 | 40.70 | 23.30 | 10.10 | 7.65 | 2.06 | 2.49 | 3.68 | 6.22 | 1192 |
| 64 | 18.70 | 11.10 | 39.00 | 15.30 | 0.30 | 1.09 | 1.82 | 7.80 | 1428 |
| 65 | 36.30 | 19.00 | 18.20 | 8.04 | 1.04 | 1.00 | 1.31 | 9.97 | 1149 |
| 66 | 17.30 | 8.59 | 20.10 | 13.00 | 0.53 | 1.03 | 7.04 | 26.60 | 1312 |
| 67 | 38.70 | 22.20 | 10.80 | 8.59 | 1.95 | 2.53 | 4.15 | 7.21 | 1169 |
| 68 | 68.40 | 21.20 | 0.31 | 6.01 | 1.18 | 0.08 | 0.33 | 0.15 | 1405 |

TABLE A-continued

| Coal Samples | $SiO_2$ | $Al_2O_3$ | CaO | $Fe_2O_3$ | $K_2O$ | $Na_2O$ | MgO | $SO_3$ | FT |
|---|---|---|---|---|---|---|---|---|---|
| 69 | 57.10 | 29.00 | 1.66 | 4.90 | 2.02 | 0.43 | 0.95 | 0.98 | 1284 |
| 70 | 35.90 | 21.70 | 13.30 | 16.90 | 0.93 | 1.82 | 0.95 | 5.82 | 1082 |
| 71 | 48.10 | 24.30 | 9.56 | 7.69 | 2.43 | 1.18 | 1.34 | 2.40 | 1225 |
| 72 | 35.60 | 19.60 | 20.30 | 9.85 | 1.15 | 2.03 | 1.09 | 7.31 | 1159 |
| 73 | 30.40 | 19.50 | 14.40 | 19.20 | 0.77 | 3.46 | 0.91 | 7.44 | 1062 |
| 74 | 28.70 | 15.50 | 26.50 | 9.03 | 0.92 | 2.06 | 1.50 | 12.10 | 1173 |
| 75 | 47.50 | 15.10 | 11.20 | 16.50 | 0.35 | 0.72 | 2.61 | 3.55 | 1118 |
| 76 | 59.06 | 22.13 | 4.51 | 5.65 | 0.97 | 0.41 | 3.46 | 2.40 | 1410 |
| 77 | 24.84 | 11.98 | 22.15 | 6.74 | 0.90 | 8.53 | 6.72 | 11.49 | 1180 |
| 78 | 31.42 | 13.72 | 21.90 | 8.40 | 0.39 | 3.60 | 1.34 | 5.88 | 1240 |
| 79 | 22.70 | 10.08 | 26.30 | 19.54 | 0.16 | 2.14 | 2.83 | 13.58 | 1310 |
| 80 | 9.63 | 6.00 | 39.45 | 27.92 | 0 | 0.42 | 4.92 | 5.59 | 1270 |

The raw material property parameters were taken as input, and the blended material property parameters were predicted by the basic properties prediction model, the ash fusion characteristics prediction model, the slurry-forming characteristics prediction model, and the gasification reactivity characteristics prediction model respectively.

In this example, with the lowest cost of the blended materials as the goal, the objective function was established by the blending scheme economy evaluation module:

$$\min P=500X_1+200X_2,$$

wherein the prices of coal and semi-coke powders were 500 RMB/ton and 200 RMB/ton respectively, and the constraint conditions of the objective function were determined as follows:

blending proportion for semi-coke powder:

$$0\leq X_2\leq 5\%,$$

the calorific value of the blended material:

$$Q_{net,ad,X}=\sum_{i=1}^{n}Q_{net,ad,i}X_i,$$

constraint for calorific value:

$$Q_{net,ad,X}\geq 25.12,$$

ash fusion characteristics of the blended material:

$$FT=f_{FT}(SiO_2,Al_2O_3,CaO,Fe_2O_3,MgO,Na_2O,TiO_2,SO_3),$$

the constraint for ash fusion characteristics:

$$FT\leq 1300,$$

ash of the blended material:

$$A_{ad,X}=\sum_{i=1}^{n}A_{ad,i}X_i,$$

the constraint for ash fusion characteristics:

$$FT\leq 1300,$$

the moisture of the blended material:

$$M_{ad,X}=\sum_{i=1}^{n}M_{ad,i}X_i,$$

the constraint for moisture:

$$M_{ad,X}\leq 8,$$

slurry-forming characteristics of the blended material:

$$D=f_D(M_{ad}, HGI, O_{ad}),$$

gasification reactivity of the blended material:

$$R=f_R(C_d, A_d, CaO, Fe_2O_3, MgO, Na_2O, V_{daf}, S_{BET}),$$

wherein, $M_{ad}$ was the inherent moisture, HGI was the grindability index, $O_{ad}$ was the oxygen content, Ca was the carbon content, Ad was the ash content, Cao, $Fe_2O_3$, MgO and $Na_2O$ were the contents of the listed oxides respectively, $V_{daf}$ was the volatile matter content, $S_{BET}$ was the specific surface area, in which the measurement method of $M_{ad}$ inherent moisture could refer to GB2565-2014, the measurement method of HGI grindability index could refer to GB/T 212-2008, the measurement method of SBET specific surface area could refer to GB/T 19587-2017, and the rest could be obtained from the raw material property parameters.

The objective function and the constraint conditions were taken as the input, and the proportion was taken as the output, the optimum coal blending ratio was obtained through the optimization model established based on the genetic algorithm was: coal 97% and semi-coke powder 3%, and the price was 491 RMB/ton. The genetic algorithm generally converts a constrained problem into an unconstrained problem through the penalty function method. In this embodiment, the raw material property parameters were the individuals of the population, and the population was divided into several sub-populations, according to the fitness value of the individuals, an optimum solution was obtained through cyclic operations of selection, crossover, and mutation. Genetic algorithm is the prior art, and the specific process of the genetic algorithm will not be repeated here.

The process simulation software was called by the blending scheme economy evaluation module to perform the gasification simulation of the obtained blending scheme and the technical and economic evaluation. The result of the gasification simulation is shown in Table 4, and the result of the technical and economic evaluation is shown in Table 5.

TABLE 4

Result of the gasification simulation

| Dry composition of crude syngas(%) | | | | | | Specific oxygen | Specific coal | Specific additive | Specific water | Effective |
|---|---|---|---|---|---|---|---|---|---|---|
| CO (%) | $H_2$ (%) | $CO_2$ (%) | $N_2$ (%) | $H_2S$ (%) | $CH_4$ (%) | consumption ($Nm^3/kNm^3$) | consumption ($kg/kNm^3$) | consumption ($kg/kNm^3$) | consumption ($kg/kNm^3$) | gas flow ($Nm^3/h$) |
| 44.47 | 33.75 | 21.20 | 0.43 | 0.13 | 0.02 | 468.12 | 689.12 | 1.28 | 459.41 | 102811.73 |

TABLE 5

Result of the technical and economic evaluation

| Oxygen consumption ($Nm^3/kNm^3$) | Coal consumption ($kg/kNm^3$) | Additive consumption ($kg/kNm^3$) | Water consumption ($kg/kNm^3$) | Oxygen cost ($RMB/kNm^3$) | Coal comprehensive cost ($RMB/kNm^3$) | Additive cost ($RMB/kNm^3$) | Water cost ($RMB/kNm^3$) | Total cost ($RMB/kNm^3$) |
|---|---|---|---|---|---|---|---|---|
| 468.12 | 689.12 | 1.28 | 459.41 | 355.77 | 387.70 | 7.68 | 0.96 | 752.12 |

Whether the current blending scheme meets the economic evaluation requirements was judged. If yes, the current blending scheme was used as the optimum blending scheme; otherwise, the economic evaluation was performed on the alternative feasible blending scheme, until the optimum blending scheme was obtained, wherein the alternative feasible blending scheme was the sub-optimum scheme that was outputted by the objective function. The obtained slag properties were predicted by the gasifier early-warning module. By using the mapping relationship in the gasification slag information management module, the obtained slag properties were matched and compared. The gasifier early-warning module sent out alarm information that the carbon residue amounts in coarse slag and fine slag reached the upper limit. The operator performed the blending scheme comparison by using the raw material property parameters in the raw material information management module and the slag property mapping relationship pre-stored in the gasification slag information management module and therefore diagnosed the blended materials. For example, in this example, it was found by comparison that the coal gasification reactivity of the used blended materials was relatively low, it was diagnosed that the possible reason was that the carbon content in the gasification residue was relatively high, thereby the proportions of the individual raw materials were updated by the blended material property prediction module, the ratio of the coal in the blended materials was reduced, and the above process was repeated until the problem of the relatively high carbon content in the gasification residue was finally solved, and an optimum blending scheme was obtained.

As shown in FIG. 3, the second aspect of the present invention provides an intelligence process for material blending in the gasification, comprising a substep of material blending in the gasification, wherein the substep of material blending in the gasification comprises:

receiving characteristic spectral line intensities of in-furnace raw materials, and obtaining raw material property parameters of raw materials based on said characteristic spectral line intensities;

establishing a prediction model, which comprises predicting blended material property parameters with the prediction model according to raw material property parameters and raw material proportions;

establishing an optimization model, and obtaining an optimized blending scheme with the optimization model according to blended material property parameters;

analyzing the technical economy of the optimized blending scheme, and outputting a blending scheme with the optimum technical economy.

Alternatively, the process further comprises a substep for raw material property standard, wherein the substep for raw material property standard comprises:

Establishing and storing a mapping relationship between different types of gasifiers and their corresponding raw materials, to determine the in-furnace raw material after the gasifier type is determined.

Alternatively, said blended material property parameters include basic properties, ash fusion characteristics, slurry-forming characteristics, and gasification reactivity.

Alternatively, said basic properties include industrial analysis parameter, elemental analysis parameter, grindability parameter, and calorific value parameter.

Alternatively, the process further comprises a substep of information management, wherein the substep of information management comprises:

storing raw material property parameters obtained from said raw material property rapid analysis module;

establishing and storing a mapping relationship between different types of gasifiers and their corresponding operation parameters;

establishing and storing a mapping relationship between the prediction for ash fusion characteristics and slurry-forming characteristics and its corresponding additives;

establishing and storing one-to-one mapping relationship among gasifier types, raw materials, gasifier operation parameters, and slag properties.

Alternatively, said substep of material blending in the gasification further comprises:

establishing a functional relationship among blended materials, gasifier operation parameters, and slag properties, predicting the corresponding slag properties according to blended materials of the obtained blending scheme with the optimum technical economy, and gasifier operation parameters, and judging whether or not the obtained slag properties are abnormal.

Alternatively, said substep for material blending in the gasification further comprises: comparing the obtained slag properties with the pre-stored slag properties in case of judging the obtained slag properties as abnormal and obtaining the relevant parameter(s) leading to the abnormal slag properties according to a mapping relationship between the pre-stored slag properties and the types of gasifiers, raw materials, and gasifier operation parameters.

The above technical solutions of the present invention construct an intelligence system for material blending in the gasification having a whole life cycle process by obtaining raw material property parameter(s) with raw material rapid analysis, predicting blended material property parameter(s) with an established prediction model based on the obtained raw material property parameter(s), and optimizing a blending scheme with an established objective function based on the obtained blended material property parameter(s), and analyzing the technical economy of the optimized blending scheme to obtain an optimum blending scheme, which effectively improves the efficiency and accuracy of the coal blending, realizes the intelligent and precise control of the material blending in the gasification, and can effectively reduce the adverse effect of raw material property problems on the enterprise.

The present application is described with reference to the flow chart and/or block diagram of the method, apparatus (system), and computer program product according to the embodiment of the present application. It should be understood that each flow and/or block in the flow chart and/or block diagram and the combination of flow(s) and/or block(s) in the flow chart and/or block diagram can be realized by computer program instructions. These computer program instructions may be provided to the processor of a general-purpose computer, a special purpose computer, an embedded processor, or another programmable data processing device to produce a machine such that the instructions executed by the processor of the computer or other programmable data processing device produce an apparatus for implementing the functions specified in one or more flows of the flow chart and/or one or more blocks of the block diagram. These computer program instructions may also be stored in a computer-readable memory capable of directing a computer or other programmable data processing device to function in a particular manner, such that the instructions stored in the computer-readable memory produce an article of manufacture comprising a command apparatus, the command apparatus implements the functions specified in one or more flows of the flow chart and/or one or more blocks of the block diagram.

These computer program instructions can also be loaded on a computer or other programmable data processing device to cause a series of operational steps to be performed on the computer or other programmable data processing device to produce a computer-implemented treatment such that the instructions performed on the computer or other programmable data processing device provide steps for implementing the functions specified in one or more flows of the flow chart and/or one or more blocks of the block diagram.

The embodiments of the present invention have been described in detail above with reference to the accompanying drawings. However, the embodiments of the present invention are not limited to the specific details of the above-mentioned embodiments. Various simple modifications may be made to the technical solutions of the embodiments of the present invention within the scope of the technical concept of the embodiments of the present invention, and these simple modifications all belong to the protection scope of the present invention.

In addition, it should be noted that each specific technical feature described in the above-mentioned Detailed Description of the Invention may be combined in any suitable manner under the circumstance that there is no contradiction. To avoid unnecessary repetition, various possible combinations are not described in the Detailed Description of the Invention.

Those skilled in the art can understand that all or part of the steps in the method for implementing the above embodiments can be completed by instructing the relevant hardware through a program, and the program is stored in a storage medium and includes several instructions to make a single-chip microcomputer, a chip or a processor execute all or part of the steps of the methods of the various embodiments of the present invention. The aforementioned storage medium includes U disk, mobile hard disk, Read-Only Memory (ROM), Random Access Memory (RAM), magnetic disk or optical disk, and other media that can store program codes.

The invention claimed is:

1. A system for material blending in gasification, the system including:

a subsystem for material blending in gasification, wherein said subsystem for material blending in gasification includes a raw material property rapid analysis module, a blended material property prediction module, a blending scheme optimization module, and a blending scheme economy evaluation module;

said raw material property rapid analysis module is for receiving characteristic spectral line intensities of in-furnace raw materials, and obtaining raw material property parameters of raw materials based on said characteristic spectral line intensities, wherein raw material property parameters of raw materials include carbon, hydrogen, sulfur, and ash-forming element contents, ash, volatile matter, and calorific value;

said blended material property prediction module is for establishing a prediction model, which comprises predicting blended material property parameters with said prediction model based on said raw material property parameters and raw material proportions, wherein said prediction model predicts basic properties, ash fusion characteristics, slurry-forming characteristics, and gasification reactivity characteristics of a blended material by establishing a basic properties prediction model, an ash fusion characteristics prediction model, a slurry-forming characteristics prediction model, and a gasification reactivity characteristics prediction model respectively, wherein the basic properties prediction model is established based on a linear weighted sum algorithm; the ash fusion characteristics prediction model, the slurry-forming characteristics prediction model, and the gasification reactivity characteristics prediction model are established based on an algorithm including BP neural network or convolutional neural networks;

said blending scheme optimization module is for establishing an optimization model and obtaining an optimized blending scheme with said optimization model based on said blended material property parameters, wherein one or more objective functions according to demand for a blending scheme and constraint conditions of the one or more objective functions are used to perform an optimization and output the optimized blending scheme;

said blending scheme economy evaluation module is for analyzing a technical economy of the optimized blending scheme and outputting a blending scheme with an optimum technical economy, wherein the blending scheme economy evaluation module calls a process simulation software to perform a gasification simulation of the outputted blending scheme, and performs a technical and economic evaluation by judging whether a current blending scheme meets economic evaluation requirements, if yes, the current blending scheme is used as an optimum blending scheme; otherwise, the technical and economic evaluation is performed on an alternative feasible blending scheme, until the optimum blending scheme is obtained, wherein the alternative feasible blending scheme is a sub-optimum scheme that is outputted by the one or more objective functions;

wherein;

said blended material property parameters include basic properties, ash fusion characteristics, slurry-forming characteristics, and gasification reactivity characteristics, said basic properties include industrial analysis parameter, elemental analysis parameter, grindability parameter, and calorific value parameter;

industrial analysis parameter includes moisture, ash, volatile matter, fixed carbon;

elemental analysis parameter includes carbon, hydrogen, oxygen, nitrogen, and sulfur.

2. The system for material blending in gasification according to claim 1, wherein the system also includes a raw material property standard subsystem, wherein said raw material property standard subsystem includes an in-furnace raw material standard management module, said in-furnace raw material standard management module is for establishing and storing a mapping relationship between different types of gasifiers and their corresponding raw materials, so as to determine the in-furnace raw materials after a gasifier type is determined.

3. The system for material blending in gasification according to claim 1, wherein the blended material property parameters predicted by said prediction model are industrial analysis parameter, elemental analysis parameter, calorific value parameter, and ash fusion characteristic parameter.

4. The system for material blending in gasification according to claim 3, wherein said system further includes an information management subsystem, wherein said information management subsystem includes a raw material information management module, a gasifier information management module, an additive information management module, and a gasification slag information management module;

said raw material information management module is for storing raw material property parameters obtained from said raw material property rapid analysis module;

said gasifier information management module is for establishing and storing a mapping relationship between different types of gasifiers and their corresponding operation parameters;

said additive information management module is for establishing and storing a mapping relationship between the prediction for ash fusion characteristics and slurry-forming characteristics and its corresponding additives;

Said gasification slag information management module is for establishing and storing one-to-one mapping relationship among gasifier types, raw materials, gasifier operation parameters, and slag properties.

5. The system for material blending in gasification according to claim 4, wherein said subsystem for material blending in gasification further comprises a gasifier early-warning module, said gasifier early-warning module is for establishing a functional relationship among blended materials, gasifier operation parameters, and slag properties, and predicting corresponding slag properties according to blended materials of the outputted blending scheme with the optimum technical economy, and gasifier operation parameters, and judging whether or not the predicted corresponding slag properties are abnormal.

6. The system for material blending in gasification according to claim 5, wherein said gasifier early-warning module is still for comparing the predicted corresponding slag properties with the slag properties in case of judging the predicted corresponding slag properties as abnormal, and obtaining relevant parameter(s) leading to the abnormal slag properties according to a mapping relationship between the slag properties and the types of gasifiers, raw materials and gasifier operation parameters.

7. The system for material blending in gasification according to claim 1, wherein said blended material property prediction module is for establishing the prediction model, which further comprises: predicting blended material property parameter(s) with said prediction model based on said raw material property parameters, said raw material proportions, inherent moisture Mad, grindability index HGI, and specific surface area SBET, and additive information, and the blended material property parameter(s) to be predicted include the slurry-forming characteristics and the gasification reactivity characteristics, and the ash fusion characteristics.

8. A process for material blending in gasification by using the system for material blending in gasification according to claim 1, the process including a substep of material blending in gasification, said substep of material blending in gasification includes:

receiving characteristic spectral line intensities of in-furnace raw materials, and obtaining raw material property parameters of raw materials based on said characteristic spectral line intensities, wherein raw material property parameters of raw materials include carbon, hydrogen, sulfur, and ash-forming element contents, ash, volatile matter, and calorific value;

establishing a prediction model, which comprises predicting blended material property parameters with said prediction model based on said raw material property parameters and raw material proportions, wherein said prediction model predicts basic properties, ash fusion characteristics, slurry-forming characteristics, and gasification reactivity characteristics of a blended material by establishing a basic properties prediction model, an ash fusion characteristics prediction model, a slurry-forming characteristics prediction model, and a gasification reactivity characteristics prediction model respectively, wherein the basic properties prediction model is established based on a linear weighted sum algorithm; the ash fusion characteristics prediction model, the slurry-forming characteristics prediction model, and the gasification reactivity characteristics prediction model are established based on an algorithm including BP neural network or convolutional neural networks;

establishing an optimization model, and obtaining an optimized blending scheme with said optimization model based on said blended material property parameters, wherein one or more objective functions according to demand for a blending scheme and constraint conditions of the one or more objective functions are used to perform an optimization and output the optimized blending scheme;

using a blending scheme economy evaluation module, analyzing a technical economy of the optimized blending scheme, and outputting a blending scheme with an optimum technical economy, wherein the blending scheme economy evaluation module calls a process simulation software to perform a gasification simulation of the outputted blending scheme, and performs a technical and economic evaluation by judging whether a current blending scheme meets economic evaluation requirements, if yes, the current blending scheme is used as an optimum blending scheme; otherwise, the technical and economic evaluation is performed on an alternative feasible blending scheme, until the optimum blending scheme is obtained, wherein the alternative feasible blending scheme is a sub-optimum scheme that is outputted by the one or more objective functions;

wherein:

said blended material property parameters include basic properties, ash fusion characteristics, slurry-forming characteristics, and gasification reactivity characteristics, said basic properties include industrial analysis parameter, elemental analysis parameter, grindability parameter, and calorific value parameter;

industrial analysis parameter includes moisture, ash, volatile matter, fixed carbon;

elemental analysis parameter includes carbon, hydrogen, oxygen, nitrogen, and sulfur.

9. The process for material blending in gasification according to claim 8, wherein the process further comprises a substep for raw material property standard, wherein the substep for raw material property standard comprises:

establishing and storing a mapping relationship between different types of gasifiers and their corresponding raw materials, so as to determine the in-furnace raw materials after a gasifier type is determined.

10. The process for material blending in gasification according to claim 8, wherein the blended material property parameters predicted by said prediction model are industrial analysis parameter, elemental analysis parameter, calorific value parameter, and ash fusion characteristic parameter.

11. The process for material blending in gasification according to claim 10, wherein the process further comprises a substep for information management, wherein the substep for information management comprises:

storing raw material property parameters obtained from said raw material property rapid analysis module;

establishing and storing a mapping relationship between different types of gasifiers and their corresponding operation parameters;

establishing and storing a mapping relationship between the prediction for ash fusion characteristics and slurry-forming characteristics and its corresponding additives;

establishing and storing one-to-one mapping relationship among gasifier types, raw materials, gasifier operation parameters, and slag properties.

12. The process for material blending in gasification according to claim 11, wherein said substep for material blending in gasification further comprises:

establishing a functional relationship among blended materials, gasifier operation parameters, and slag properties, predicting corresponding slag properties according to blended materials of the outputted blending scheme with the optimum technical economy, and gasifier operation parameters, and judging whether or not the predicted corresponding slag properties are abnormal.

13. The process for material blending in gasification according to claim 12, wherein said substep for material blending in the gasification further comprises:

comparing the predicted corresponding slag properties with the slag properties in case of judging the predicted corresponding slag properties as abnormal, and obtaining relevant parameter(s) leading to the abnormal slag properties according to a mapping relationship between the slag properties and the types of gasifiers, raw materials, and gasifier operation parameters.

14. The process for material blending in gasification according to claim 8, wherein the establishing the prediction model further comprises:

predicting blended material property parameter(s) with said prediction model based on said raw material property parameters, raw material proportions, inherent moisture Mad, grindability index HGI, and specific surface area SBET, and additive information, and the blended material property parameter(s) to be predicted include the slurry-forming characteristics and the gasification reactivity characteristics, and the ash fusion characteristics.

* * * * *